May 30, 1933.                J. A. WILLOUGHBY                1,912,234
                             RADIO DIRECTION FINDER
                             Filed Jan. 8, 1929        6 Sheets-Sheet 1
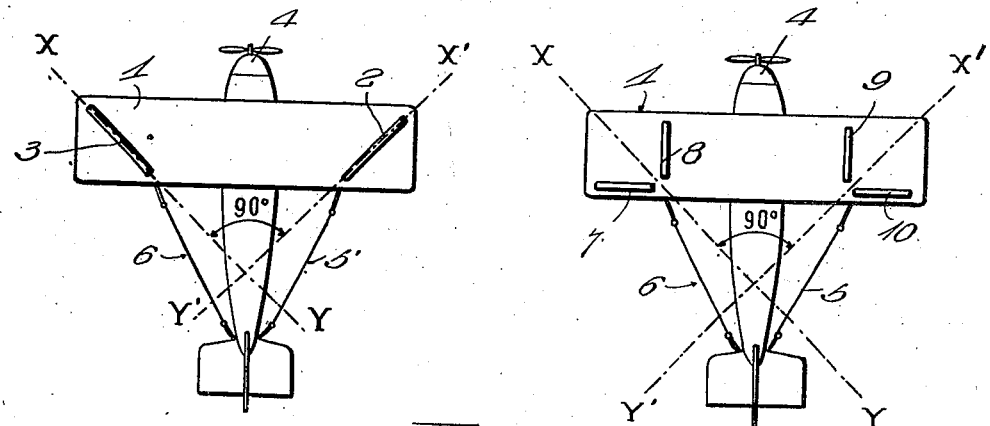
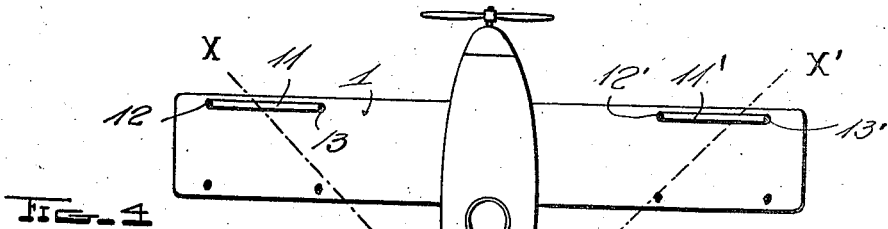
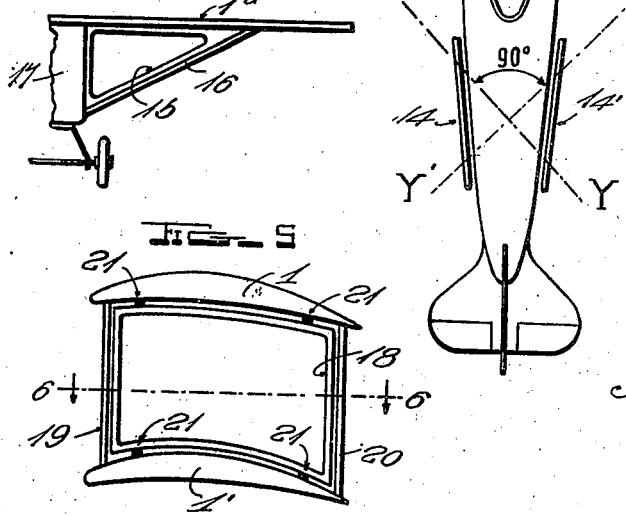
INVENTOR.
John A. Willoughby,
BY
           ATTORNEY.

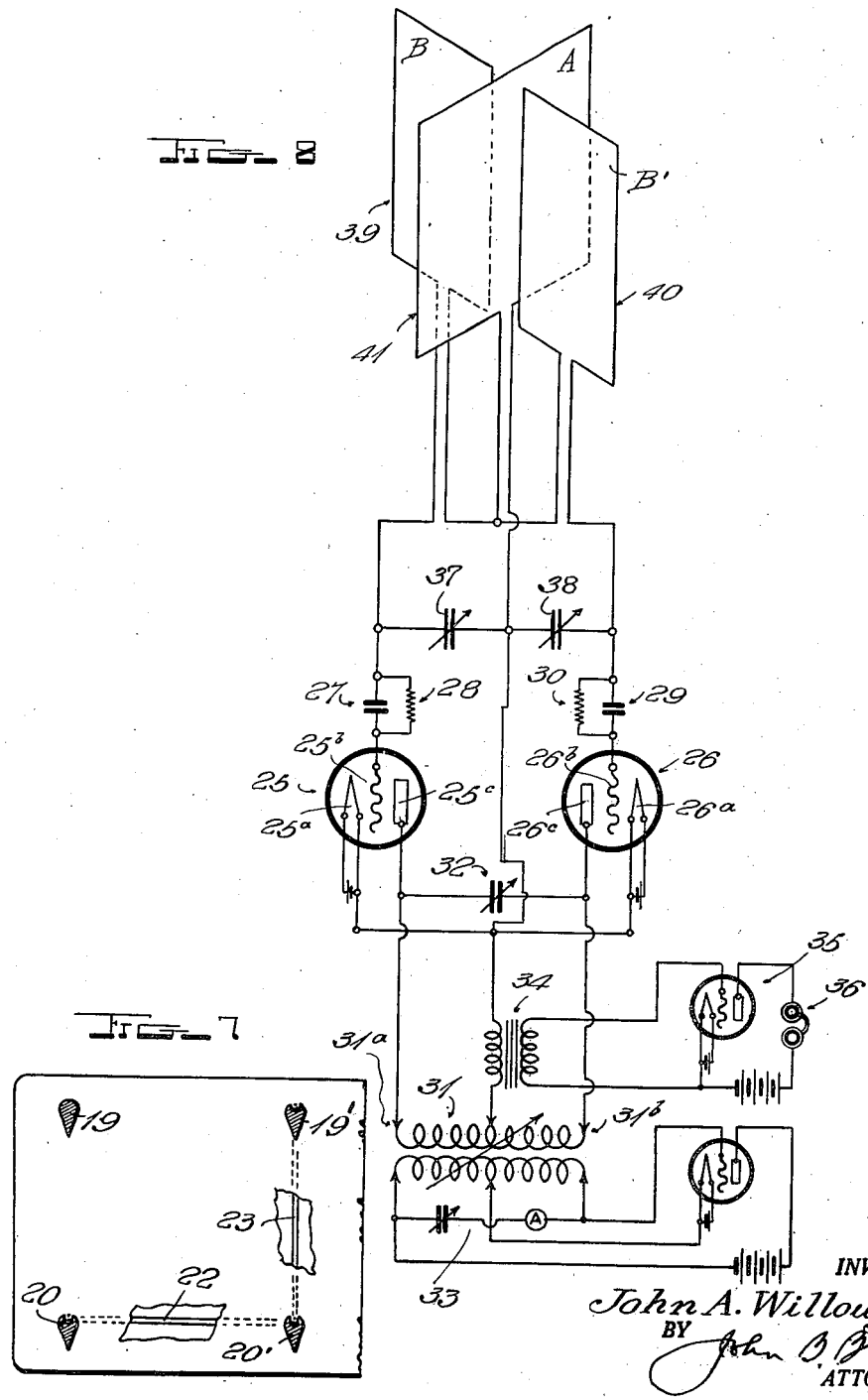

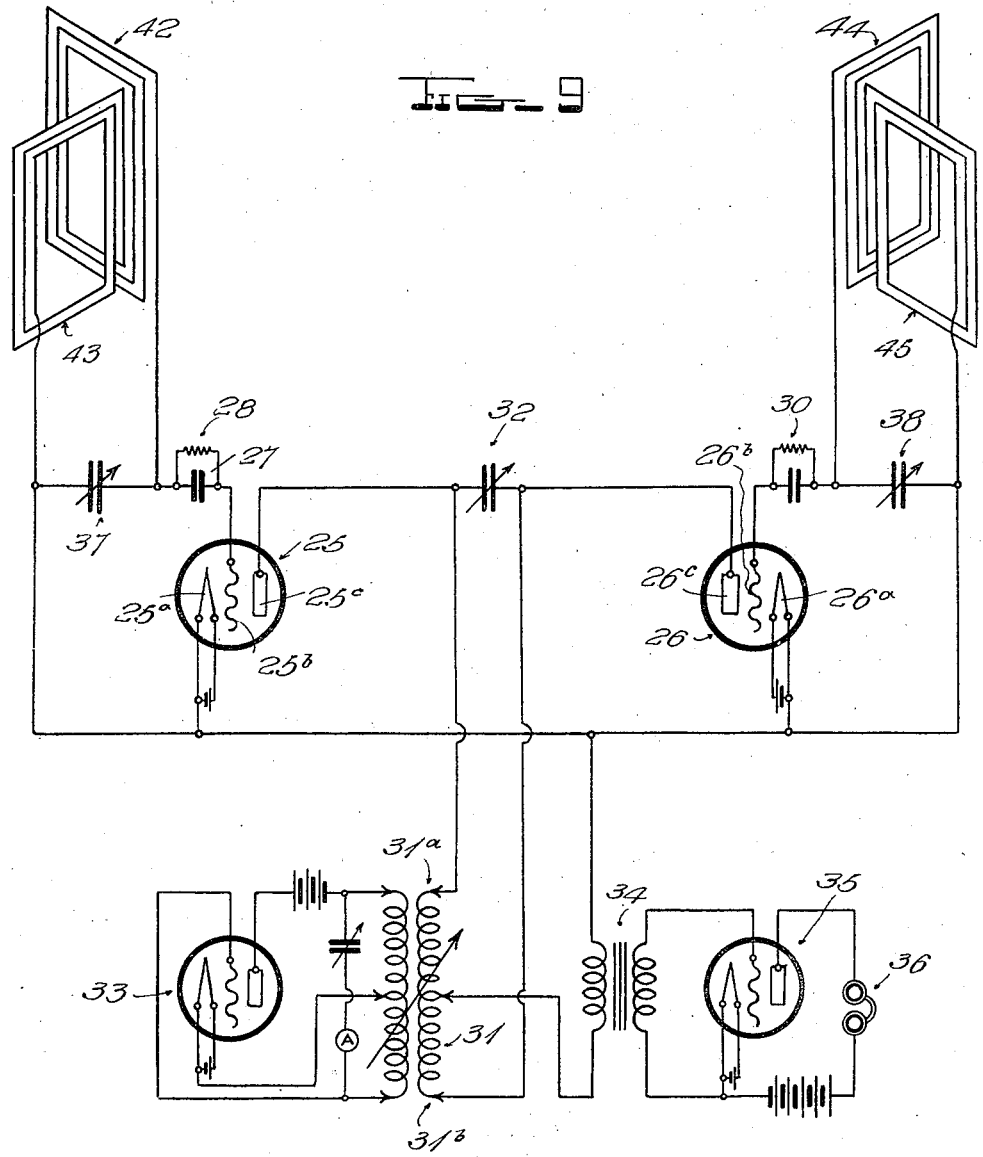

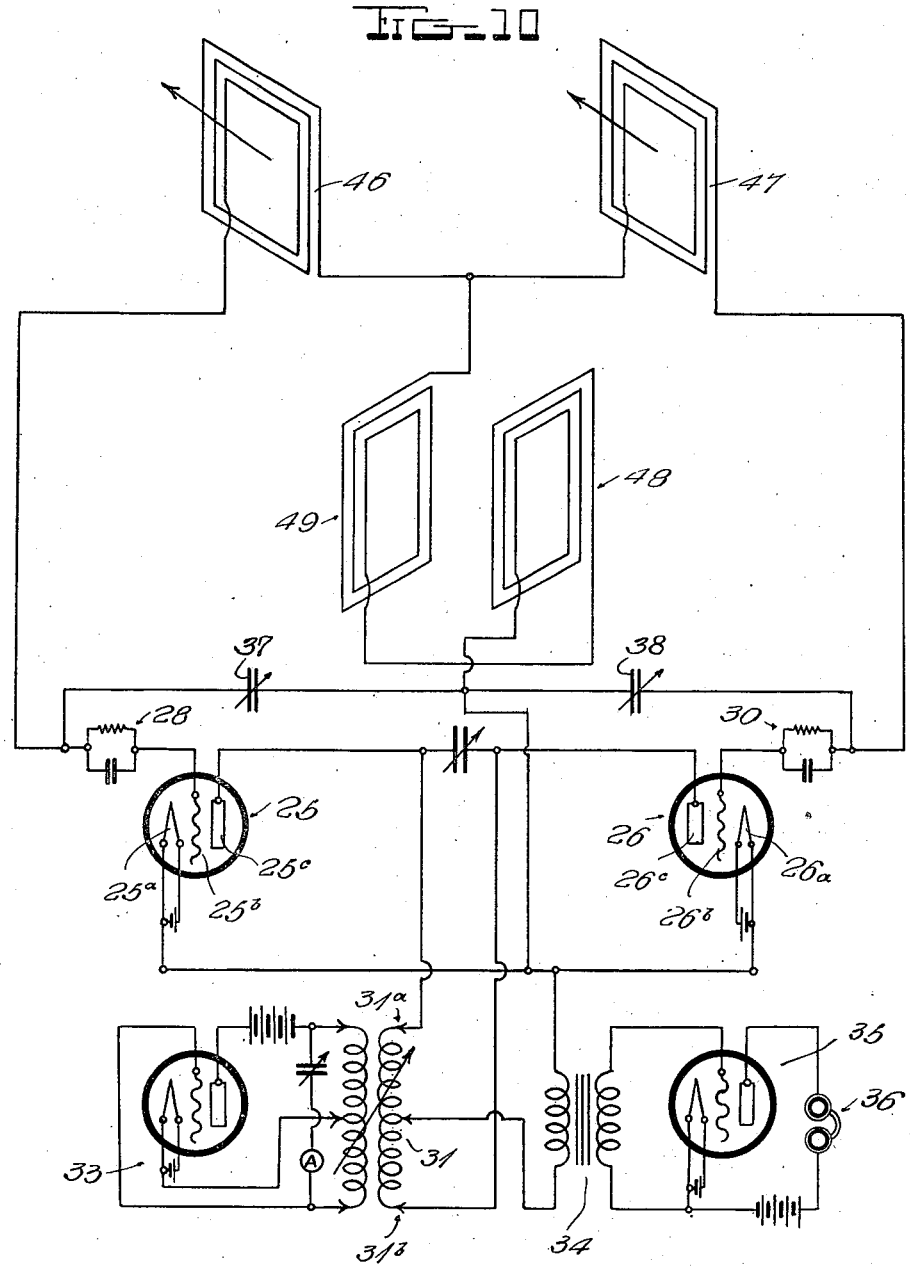

May 30, 1933.　　J. A. WILLOUGHBY　　1,912,234
RADIO DIRECTION FINDER
Filed Jan. 8, 1929　　6 Sheets-Sheet 5
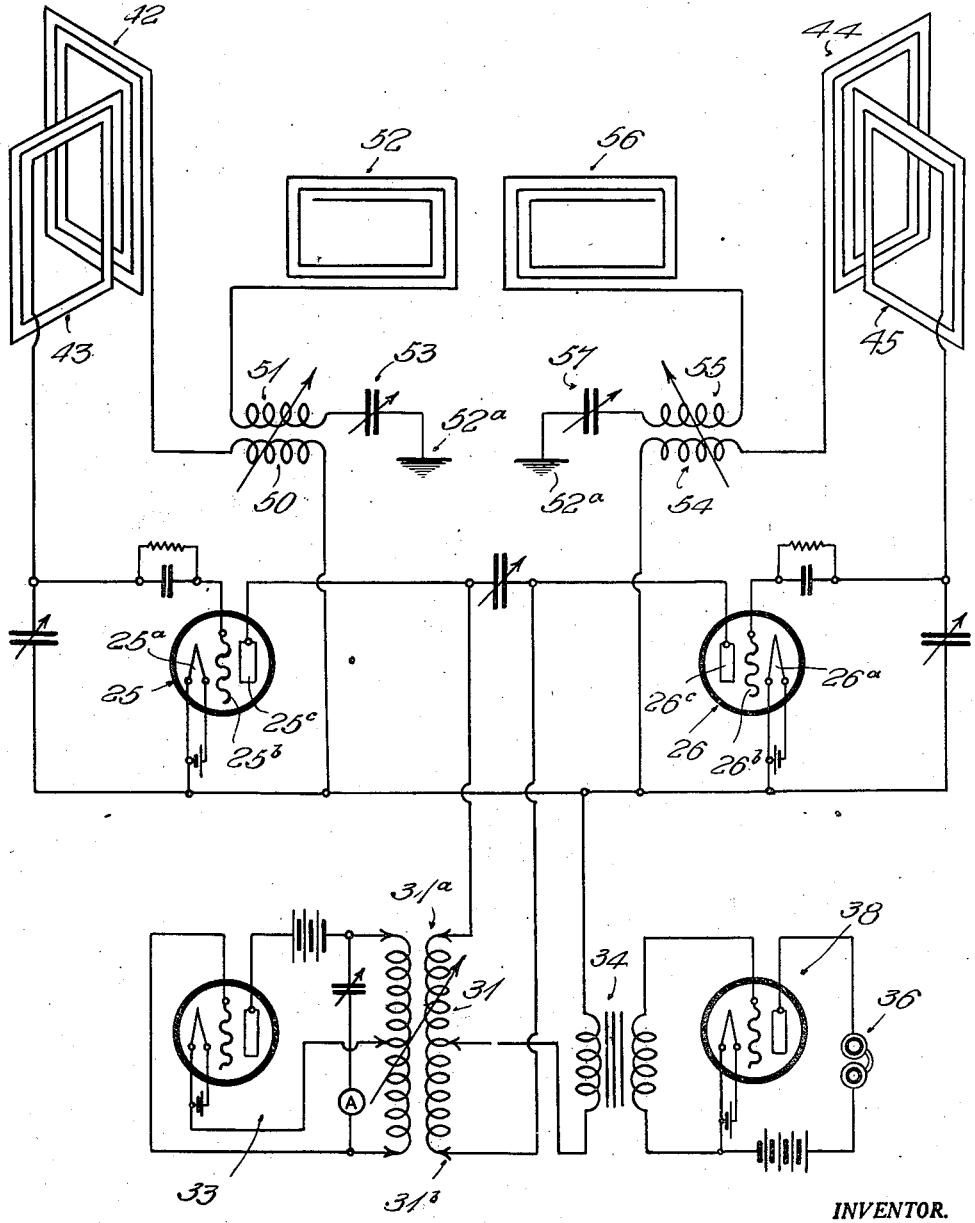
INVENTOR.
John A. Willoughby,
BY
ATTORNEY

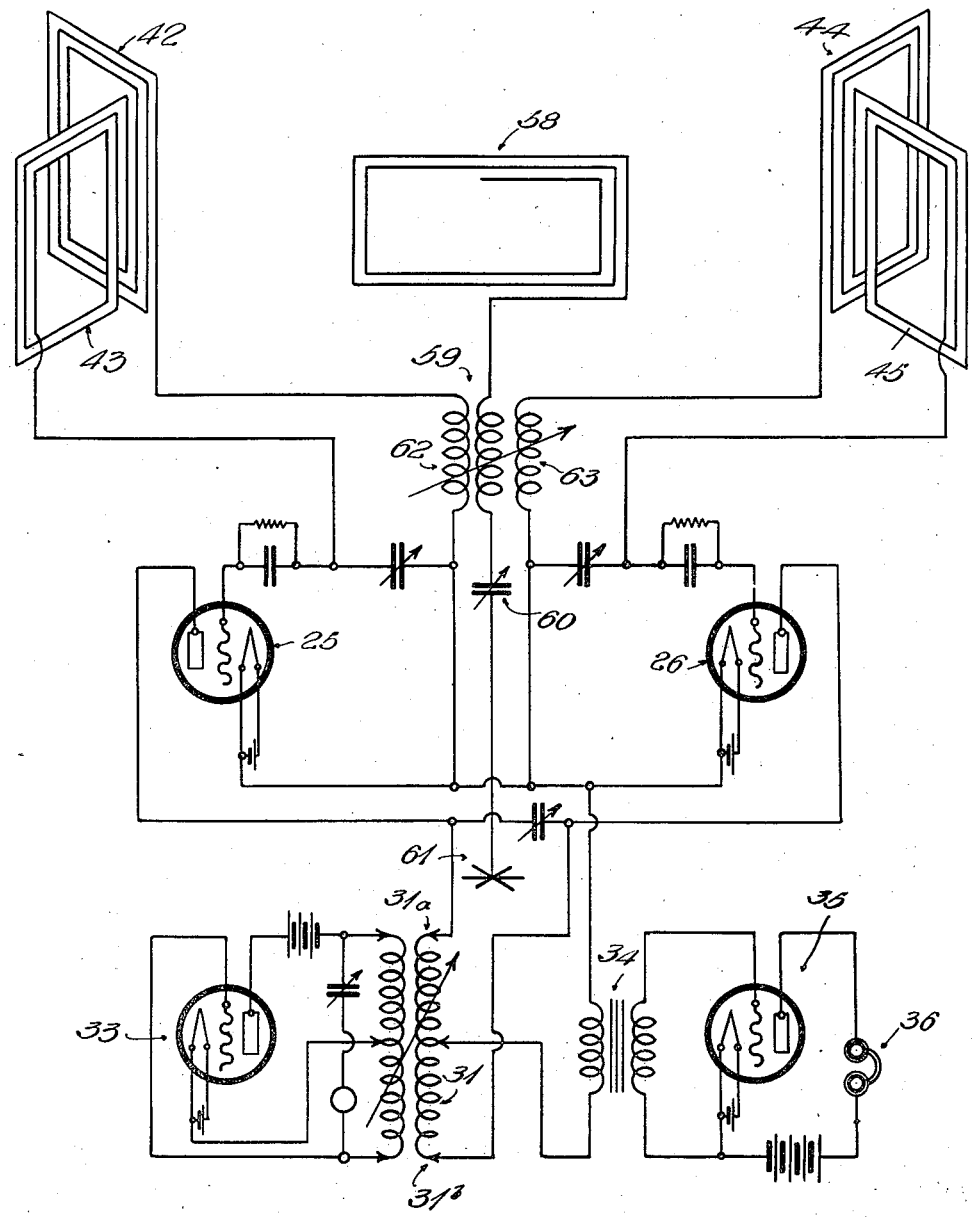

Patented May 30, 1933

1,912,234

UNITED STATES PATENT OFFICE

JOHN A. WILLOUGHBY, OF CAMBRIDGE, MASSACHUSETTS

RADIO DIRECTION FINDER

Application filed January 8, 1929. Serial No. 331,003.

This invention relates broadly to signal reception systems generally. More specifically this invention relates to guiding systems for airships and other moving craft.

An object of this invention is to provide a signal receiving system in which signaling energy is intermittently received by each of a plurality of receiving sets and impressed upon a common observing circuit.

Another object of this invention is to provide a guiding system for moving craft in which signaling energy is impressed upon a plurality of receiving circuits from directive electromagnetic wave intercepting devices and in which energy modulated in accordance with energy received from each of the directive wave intercepting devices is intermittently and periodically impressed upon a common observing circuit.

A still further object of this invention is to provide an electron discharge device circuit arrangement in which each of a plurality of input circuits is energized by different signaling energy and in which the corresponding output circuits are successively and periodically energized whereby energy modulated successively and periodically by the various signals impressed upon the input circuit is impressed upon a common observing circuit.

Still another object of this invention is to provide a guiding system for moving craft in which signaling energy from a common transmitting station is intercepted by directive collector systems connected to individual receiving systems which are periodically and successively energized and in which energy from the output circuits of the individual receiving systems is impressed upon a common observing circuit for determining when the craft is deviating from its course.

Other objects and features of this invention will be apparent to those skilled in the art to which this invention pertains from the following specification and the appended claims.

According to this invention a moving craft is equipped with a system employing electron discharge devices which are provided with a plurality of input circuits each of which is provided with a directive collector system or antennæ. Signaling energy transmitted by a certain station in the direction in which the craft is moving is intercepted equally by each of the collector systems when moving in a predetermined course. Each of the electron discharge devices is provided with an output circuit. An arrangement which intermittently and in periodic order energizes the output circuits of the electron discharge devices is in electrical relation with the output circuit and with a common observing circuit. Energy which is successively and periodically modulated in accordance with signaling energy intercepted by each of the collector systems is impressed upon the common observing circuit whereby any deviation from the course by the moving craft is immediately detected.

Referring to the drawings Figures 1, 2, 3 and 4 illustrate directive antenna arrangements positioned upon aircraft; Figs. 5, 6, and 7 illustrate in detail the manner in which antennæ are positioned upon the surfaces of aircraft; Fig. 8 illustrates a circuit arrangement employed in one form of this invention; Fig. 9 shows the circuit arrangement employed wherein two sets of directive antennæ are employed; and Figs. 10, 11 and 12 illustrate the circuit arrangement employed in the modifications wherein additional direction restricting antennæ are used.

In Fig. 1 of the drawings, reference numeral 1 designates the wing structure of the aircraft 4. Directive antennæ 2 and 3 are mounted in such a manner that they are directive in directions X—Y and X'—Y' at an angle of 45° to the line of symmetry of the aircraft and at an angle substantially 90° to each other. Antennæ 5 and 6 are supported between the wing structure and the latter part of the fuselage. The antennæ 5 and 6 are employed to make the collector system undirectional.

In Fig. 2 two loop antennæ 7 and 8 mounted at substantially right angles to each other are employed in the place of the single loop antenna system illustrated in Fig. 1. This arrangement is more practical and convenient in some types of aeroplanes than the arrangement of Fig. 1, especially in biplanes where specially designed lower wings necessitating perfect stream lines are employed.

The loop antenna system 7 and 8 is directive in the direction X—Y which is at an angle of substantially 45° to the line of symmetry of the aircraft when one of the loop antennæ is parallel to the line of symmetry. The loop antennæ 9 and 10 are also disposed at right angles to each other and are directive to signals in the direction X'Y'. The manner in which the loop antennæ are mounted between the wings and along the fuselage of a biplane is illustrated in Fig. 3 wherein 11 and 11' designate a loop antenna system mounted between the struts 12 and 13 and 12' and 13' of the wings 1 and 1'. Another loop antenna system 14 and 14' is mounted either on the inside or outside of the fuselage and at substantially right angles to antennæ 11 and 11'.

In Fig. 4 a modification of this invention adapted for use in the monoplane type of aircraft is illustrated. A triangularly shaped loop antenna system 15 is positioned between the struts 16, the body 17 and the wing 1a. A loop antenna similar to 15 may be mounted on the wings on both sides of the monoplane. At right angles to the loops mounted on the wings either a single loop antenna and a pair of frame antennæ similar to antennæ 14 and 14' of Fig. 3 are mounted upon the fuselage. The frame portion of the loop antenna may be made of molded phenol condensation products or other insulating material known in the art in order that proper insulation is provided between the metal parts of the aircraft adjacent to the antenna. The frame of the loop antenna also may be made of an elongated elliptical cross-section in order that the wind resistance thereof may be as small as possible.

The manner in which the loop antennæ are mounted upon the wings of the aircraft is shown in detail in Fig. 5 in which the loop antenna 18 is shown positioned between the struts 19 and 20 of the wings 1 and 1'. Insulating members 21 are provided to support the antenna away from the wing structure. These insulating members may be of rubber or similar insulating material. In case metal wing structure is employed the loop frames may be designed to give the proper stream line effect and the frame fitted between the wing structure 1 and 1' directly against the wing surface. The loop antenna frame may be made to fit directly against the struts between the wings as shown or it may be displaced therefrom.

The manner in which the antennæ are positioned upon the lower wing of an aeroplane is illustrated in Fig. 6 which is a sectional view taken along the line 6—6 of Fig. 5. The antenna system 18 comprising conductors 18' molded in phenol condensation materials or similar insulating compositions is positioned between the struts 19 and 19'. The external configuration of the loop antenna frame is such that it offers a minimum of wind resistance. In Fig. 7 the position of the loop antennæ 22 and 23 which correspond to the antennæ 7 and 8 of Fig. 2 is shown with respect to the struts 19, 19', 20 and 20' and the lower wing 1'. The conductors of the loop antenna 22 are placed and supported within slots cut into the struts 20 and 20' and through the interior of the wing structure through tubing of insulating material. The conductors of loop antenna 23 are similarly placed into slots cut into struts 19' and 20'. By placing the conductors of the loop antennæ into slots formed in the strut and through the interior of the wing structure the stream line effect of the wings is not destroyed.

Referring to Fig. 8 of the drawings the reference numerals 25 and 26 designate electron discharge devices having cathode, grid and anode electrodes 25a, 25b, 25c and 26a, 26b, 26c, respectively. Grid leak resistance units 28 and 30 and grid condensers 27 and 29 are connected to the grid electrodes of electron discharge devices 25 and 26, respectively. The anode electrodes are connected to the terminals of the inductance 31 which is coupled to the output circuit of a low frequency oscillation generator 33. The frequency of the oscillation generator 33 may be varied in order that the anode circuits of the electron discharge devices 25 and 26 may be alternately energized at any desired rate. Condenser 32 is connected across the inductance 31. The primary winding of the transformer 34 is connected to the cathodes 25a and 26a and the electrical center of the inductance 31. The secondary winding of the transformer 34 is connected to the input of the amplifier 35 in the output circuit of which is connected a telephone set 36 or other indicating device. Loop antennæ or other type of coil antennæ 39, 40 and 41 and condensers 37 and 38 are connected to the input circuits of the electron discharge devices 25 and 26. In operation the electron discharge device 25 receives energy in its input circuit from the loop antennæ 39 and 41 and the electron discharge device 26 receives energy in its input circuit from the loop antennæ 40 and 41. The anode circuit of the device 25 is energized when the terminal 31a of the inductance 31 is positive and energy modulated in accordance with signals intercepted by the antenna 39 and 41 is impressed upon the amplifier 35 through the transformer 34. When the terminal 31b is positive with respect to the terminal 31a the anode circuit of the electron discharge device 26 is energized and energy modulated in accordance with signals intercepted by the antenna 40 and 41 is impressed upon the amplifier 35. When the signals heard through the device 36 are continuous then the waves intercepted by the antennæ 39 and 41 and antennæ 40 and 41 are of equal magnitude. When the signals heard through the device 36 are alternately strong and weak then the wave trains intercepted by the antennæ 41 and 39 and antennæ 41 and 40 are of unequal magnitude. When the response obtained from the device 36 is of uniform and unvarying intensity, the signal energy impressed upon the input circuits of both of the electron discharge devices 25 and 26 is substantially equal.

In a modified arrangement shown in Fig. 9 loop antennae 42 and 43 disposed at an angle of approximately 90° with respect to each other are connected to the input circuit of the electron discharge device 25. These antennæ 42 and 43 may be connected either in series as shown in Fig. 9 or in parallel. Two wave length ranges are thus possible with the loop system for one setting of the condenser 37. A similar arrangement of loop antennae 44 and 45 is connected to the input circuit of electron discharge device 26. The antennæ systems 42, 43 and 44, 45 may be positioned upon the wing structure of an aeroplane in the manner shown in Figs. 2 and 7, loop antennæ 42 and 43 of Fig. 9 corresponding to loop antennæ 7 and 8 of Fig. 2 and 22 and 23 of Fig. 7.

Referring to Fig. 10, antennæ 48 and 49 are disposed one on each side of the fuselage of an aeroplane as shown by 14 in Fig. 3, and are connected into circuit with antennæ 46 and 47, which are disposed upon the wings of an aeroplane as shown by 11 and 11' (Fig. 3).

By interposing the antennæ 48 and 49 between the loop antennæ 46 and 47 the former are rendered directive in lines displaced by 45° from the lines normal to their planes and in directions at right angles to each other. For example, where the antennæ 46 and 47 are disposed upon the wing 1 at an angle of approximately 90° with respect to the fuselage of the aeroplane as shown by antennæ 11 and 11' of Fig. 3 and the antennæ 48 and 49 are supported alongside of the fuselage as designated by antennæ 14 and 14' (Fig. 3) greater response would be received on the signals coming from the XY and X'Y' directions than on signals coming from any other directions. The object of the antennæ 46 and 47 is to cause the field intensity characteristics of the antennæ 48 and 49 to be shaped with the greatest intensity in the directions displaced 45° from the planes of the antennæ. According to the systems of Figs. 3 and 10 signaling energy is alternately intercepted from the XY and X'Y' directions.

As shown in a further modified form of this invention illustrated in Fig. 11 two capacity antennæ are coupled to the circuits of the electron discharge devices 25 and 26 through inductances 50, 51 and 54, 55 respectively. The capacity antennæ 52 and 56 may consist of stream lined metal tubing or any conductive network horizontally disposed upon the lower or upper wings of the aeroplane and insulated therefrom. Inductance 50 is connected in series with the input circuit of the electron discharge device 25 and the circuits of the loop antennæ 42 and 43. Inductance 51 is connected in series with the antenna 52, condenser 53 and the aeroplane frame 52a. The inductance 54 is connected in series with the circuits of the loop antennæ 44 and 45. Inductance 55 which is connected in series with the capacity antenna 56 and the condenser 57 is also grounded to the frame of the aeroplane.

In Fig. 12 a single antenna counterpoise system including the capacity antenna 58, the coupling inductance 59, tuning condenser 60 and counterpoise 61 is coupled to the loop systems 42, 43 and 44, 45 and to the input circuits of both of the electron tube systems 25 and 26 through the inductances 62 and 63, respectively. Loop antenna systems 42, 43 and 44, 45 are connected to the inductances 62 and 63 respectively and to the input circuits of electron discharge devices 25 and 26, respectively.

The operation of the arrangements shown in Figs. 9, 10, 11 and 12 is substantially the same as that of the arrangement shown in Fig. 8 in that a continuous signal of practically equal intensity is audible in the telephone set or other indicating device 36 when the aeroplane is proceeding directly toward the station from which signals are being intercepted. However, when the aeroplane is not proceeding toward the station from which signals are being intercepted an alternately loud and weak response will be obtained in the device 36 because of the fact that the antenna systems corresponding to antennæ 42, 43 and 44, 45 of Figs. 9, 11 and 12 and antennæ 46 and 47 of Fig. 10 which are mounted upon the wings of the aeroplane do not intercept the wave trains from the transmitting station at the same angle and consequently do not receive the same amount of energy. If speech or music is being received by the system on the aeroplane it will be intelligible when the aeroplane is proceeding in the correct direction, that is, toward the transmitting station, and unintelligible when the aeroplane is not proceeding toward the transmitting station.

Furthermore the system herein disclosed is automatic in its operation in that no switching devices are employed in obtaining the bearings of the aeroplane. All objectionable noises which usually accompany switching operations in radio circuits as well as the risk of detuning the tuned circuits associated with the electron discharge devices are thereby avoided.

While I have described my invention in great detail I realize that many modifications are possible and it is to be understood that the embodiments of my invention are not to be limited by the foregoing specification and the accompanying drawings but only by the scope of the appended claims.

What I claim and desire to secure by Letters Patent of the United States is as follows:

1. In a guiding system for moving vessels the combination of a plurality of directional antenna systems mounted in predetermined planes in spaced relation on the vessel, a plurality of electron discharge devices, equal in number to the number of antenna systems, output and input circuits therefor, each of said directional antennæ being in individual electrical relation with an input circuit of one of said electron discharge devices, a non-directional antenna carried by the vessel in symmetrical relation to said directional antenna systems on said vessel, means coupling said non-directional antenna with the input circuits of said electron discharge devices, and a source of anode supply for said electron discharge devices adapted for periodically successively energizing the output circuits of said electron discharge devices.

2. In a guiding system for moving vessels the combination of a plurality of directional antenna systems disposed in predetermined planes at opposite sides of the vessel, a plurality of electron discharge devices, output and input circuits therefor, each of said directional antennæ being in individual electrical relation with an input circuit of one of said electron discharge devices, a non-directional antenna system carried by the vessel in symmetrical relation to the aforesaid directional antenna systems, means coupling said non-directional antenna system with the input circuits of said electron discharge devices, a source of anode supply for said electron discharge devices adapted for periodically successively energizing the output circuits of said electron discharge devices, and an observing circuit in electrical relationship with said output circuits.

3. In a guiding system for moving vessels the combination of a plurality of directional antenna systems disposed in predetermined planes on opposite sides of the center line of the vessel, a plurality of electron discharge devices, input and output circuits therefor, each of said directional antennæ being in individual electrical relation with a circuit of one of said electron discharge devices, a non-directional antenna system carried by the vessel in symmetrical relation to the aforesaid directional antenna systems, means coupling said non-directional antenna system with the input circuits of said electron discharge devices, a source of supply for energizing the output circuits of said electron discharge devices in a predetermined periodic order, and an observing circuit in balanced electrical relationship with circuits of said electron discharge devices, said observing circuit being energized periodically and successively by energy received from each of said output circuits.

4. In a guiding system for vessels moving over a predetermined course the combination of a plurality of directional antenna systems disposed in predetermined planes on opposite sides of the center line of the vessel, a plurality of electron discharge devices, input and output circuits therefor, each of said directional antennæ being in individual electrical relationship with a circuit of one of said electron discharge devices, a non-directional antenna system symmetrically arranged with respect to the aforesaid directional antenna systems and adjacent the center line of the vessel, means coupling said non-directional antenna system with the input circuits of said electron discharge devices, a source of supply for energizing the output circuits of said electron discharge devices successively in a predetermined periodic order, and an observing circuit in electrical relation with all of the output circuits of said electron discharge devices, said observing circuit being adapted to receive energy from said output circuits in the same periodic order in which said output circuits are energized.

5. In a guiding system for vessels moving over a predetermined course the combination of a plurality of directional antenna systems disposed in predetermined planes on opposite sides of the center line of the vessel, a plurality of electron discharge devices, input and output circuits therefor, each of said directional antennæ in individual electrical relationship with a circuit of one of said electron discharge devices, a non-directional antenna system symmetrically arranged with respect to the aforesaid directional antenna systems and adjacent the center line of the vessel, means coupling said non-directional antenna system with the input circuits of said plurality of electron discharge devices, a source of supply for successively energizing the output circuits of said electron discharge devices in a periodic order, said source comprising a low frequency oscillation generator, and an observing circuit in electrical relation with said output circuits.

6. In a system of the class described the combination of a plurality of directional antennæ disposed in spaced positions on aircraft, means connected with said directional antennæ and disposed on the aircraft intermediate the directional antennæ whereby said antennæ are rendered unidirectional, an observing circuit, a plurality of electron discharge devices each having cathode, grid, and anode electrodes, input and output circuits therefor, said directional antennæ being in electrical relation with said grid electrode circuits whereby signaling energy intercepted by said directional antennæ is impressed upon said grid electrodes, a source of supply for successively and alternately energizing the anode electrodes of each of said electron discharge devices, connections between said observing circuit and said output circuits whereby energy modulated in accordance with signals intercepted first by one of said directional antenna and then another of said directional antennæ is successively impressed upon said observing circuit.

7. In a system of the class described the combination of a plurality of directional antennæ mounted upon spaced portions of the wings of an aeroplane, means mounted on the fuselage of said aeroplane for rendering said directional antennæ unidirectional, a plurality of electron discharge devices having grid, cathode and anode electrodes, circuits associated with said grid and anode electrodes, each of said directional antennæ being in electrical relation with a grid circuit of one of said electron discharge devices, a source of supply in electrical relation with the anode circuits of said electron discharge devices whereby said anode circuits are periodically energized, an observing circuit in electrical relation with said output circuits whereby energy modulated in accordance with the signaling energy is periodically fed into said observing circuit from each of said output circuits.

8. In a system of the class described the combination of a plurality of directive antennæ disposed in predetermined planes with respect to the line of symmetry of the vessel, a plurality of electron discharge devices, input and output circuits therefor, a non-directional antenna arranged in symmetrical relation to the aforesaid directive antennæ adjacent the line of symmetry of the vessel, means coupling said directional and non-directional antennæ with the input circuits of said electron discharge device, a source of supply for energizing said output circuits, means incorporated in said source whereby each of said output circuits is successively automatically energized periodically, an electrostatic coupling between said output circuits and observing means in electrical relation with said output circuits, said observing means having energy impressed thereon successively and periodically from each of said output circuits.

9. In a radio navigation system, a mobile ship, two coil antennæ disposed laterally on said ship substantially at right angles to each other and each disposed substantially at forty-five degrees to the fore and aft line of said ship on opposite sides of the line of symmetry of the ship, two electron tubes, balanced input and output circuits therefor, electrostatic means for coupling said output circuits together the terminals of each of said coil antennæ being connected to the input of each of said tubes respectively, the anodes of said tubes being connected to the respective terminals of one winding of a transformer, the mid-tap of said winding being connected through the primary winding of an output transformer to the cathodes of said tubes, a signal responsive device connected to the secondary of said output transformer, the other winding of said first mentioned transformer being connected to a low frequency generator whereby the variations in signal intensity in said signal responsive device indicate the orientation of the line of symmetry of said ship with reference to the direction of an incoming radio wave.

10. In a radio navigation system, a mobile body, a set of two coil antennæ disposed substantially at right angles to each other and connected in series, a second set of two coil antennæ connected in series and disposed substantially at right angles to each other and respectively substantially parallel to each of said first mentioned coil antennæ, said sets of coil antennæ being located on opposite sides of the line of symmetry of the mobile body, two electron tubes, balanced input and output circuits therefor, the terminals of each of said sets of coil antennæ being connected to the input of each of said tubes respectively, electrostatic means coupling the output circuits of said tubes, the anodes of said tubes being connected to the respective terminals of one winding of a transformer, the mid-tap of said winding being connected through the primary winding of an output transformer to the cathodes of said tubes, a signal responsive device connected to the secondary of said output transformer, the other winding of said first mentioned transformer being connected to a low frequency generator, whereby the variations in signal intensity in said signal responsive device indicate the orientation of the line of symmetry of the mobile body with reference to the direction of an incoming radio wave.

11. In a radio navigation system, a mobile body a set of two coil antennæ substantially at right angles to each other and connected in parallel, a second set of two coil antennæ connected in parallel and substantially at right angles to each other and respectively substantially parallel to each of said first mentioned coil antennæ, said sets of coil antennæ being located in opposite sides of the line of symmetry of the mobile body, two electron tubes, balanced input and output circuits therefor, the terminals of each of said sets of coil antennæ being connected to the input of each of said tubes respectively, means electrostatically coupling said output circuits, the anodes of said tubes being connected to the respective terminals of one winding of a transformer, the mid-tap of said winding being connected through the primary winding of an output transformer to the cathodes of said tubes, a signal responsive device connected to the secondary of said output transformer, the other winding of said first mentioned transformer being connected to a low frequency generator, whereby the variations in signal intensity in said signal responsive device indicate the orientation of said coil antenna system with reference to the direction of an incoming radio wave.

12. In a radio navigating system, a mobile body, a set of two coil antennæ substantially at right angles to each other and connected in series, a second set of two coil antennæ connected in series and substantially at right angles to each other and respectively substantially parallel to each of said first mentioned coil antennæ, said sets of coil antennæ being located on opposite sides of the line of symmetry of the mobile body, two capacity antenna systems respectively in electrical relation with each of said sets of coil antennæ and disposed adjacent the line of symmetry of said mobile body, two electron tubes, balanced input and output circuits therefor, the terminals of each of said sets of coil antennæ being connected to the input of each of said tubes respectively, the anodes of said tubes being connected to the respective terminals of one winding of a transformer, the mid-tap of said winding being connected through the primary winding of an output transformer to the cathodes of said tubes, a signal responsive device being connected to the secondary of said output transformer, the other winding of said first mentioned transformer being connected to a low frequency generator, whereby the variations in signal intensity in said signal responsive device indicate unidirectionally the orientation of the line of symmetry of the mobile body with reference to the direction of an incoming radio wave.

13. In a radio navigating system, a mobile body, a set of two coil antennæ substantially at right angles to each other and connected in series, a second set of two coil antennæ connected in series and substantially at right angles to each other and respectively substantially parallel to each of said first mentioned coil antennæ, said sets of coil antennæ being located on opposite sides of the line of symmetry of the mobile body, a capacity antenna system in electrical relation with both of said sets of coil antennæ, and disposed adjacent the line of symmetry of said mobile body, two electron tubes, balanced input and output circuits therefor, the terminals of each of said sets of coil antennæ being connected to the input of each of said tubes respectively, the anodes of said tubes being connected to the respective terminals of one winding of a transformer, the mid-tap of said winding being connected through the primary winding of an output transformer to the cathodes of said tubes, a signal responsive device connected to the secondary of said output transformer, the other winding of said first mentioned transformer being connected to a low frequency generator, whereby the variations in signal intensity in said signal responsive device indicate unidirectionally the orientation of the line of symmetry of the mobile body with reference to the direction of an incoming radio wave.

In testimony whereof I affix my signature.

JOHN A. WILLOUGHBY.